US012748699B2

(12) United States Patent
Bacher et al.

(10) Patent No.: US 12,748,699 B2
(45) Date of Patent: Sep. 29, 2026

(54) UTILIZING CACHE IN A QUANTUM SYSTEM

(71) Applicant: INTERNATIONAL BUSINESS MACHINES CORPORATION, Armonk, NY (US)

(72) Inventors: Utz Bacher, Dettenhausen (DE); Daniel Kaulen, Simmerath (DE); Johannes Severin Kern, Boeblingen (DE); Christian Wilhelm Paul Hoerst, Boeblingen (DE); Einar Lueck, Filderstadt (DE)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 18/916,985

(22) Filed: Oct. 16, 2024

(65) Prior Publication Data

US 2026/0105001 A1 Apr. 16, 2026

(51) Int. Cl.
*G06F 12/08* (2016.01)
*G06F 12/0802* (2016.01)

(52) U.S. Cl.
CPC ...... *G06F 12/0802* (2013.01); *G06F 2212/60* (2013.01)

(58) Field of Classification Search
CPC ............. G06F 12/0802; G06F 12/0215; G06F 2212/60; G06F 2212/654; G06N 10/00; G06N 10/20; G06N 10/80
See application file for complete search history.

(56) References Cited

U.S. PATENT DOCUMENTS

| | | | |
|---|---|---|---|
| 10,929,294 B2 | 2/2021 | Brahm et al. | |
| 11,645,203 B2 | 5/2023 | Gunnels et al. | |
| 11,977,957 B2 | 5/2024 | Shanmugam Sakthivadivel et al. | |
| 2021/0117324 A1* | 4/2021 | Gunnels ................. | G06N 10/20 |
| 2023/0040849 A1* | 2/2023 | Shanmugam Sakthivadivel ......... | G06N 10/80 |

OTHER PUBLICATIONS

NPL "ECAP: energy-efficient caching for prefetch blocks in tiled chip multiprocessors" by Deb et al.; (Year: 2019).*

Amadeo et al., "In-Network Placement of Reusable Computing Tasks in an SDN-Based Network Edge", IEEE Transactions on Mobile Computing, vol. 23, No. 2, Feb. 2024, 1456-1471.

* cited by examiner

*Primary Examiner* — Tracy C Chan
(74) *Attorney, Agent, or Firm* — Joseph P. Curcuru

(57) ABSTRACT

In an approach to improve quantum computing systems improve efficiency of a quantum computing system. Various embodiments perform a first quantum computation on a quantum processor of a quantum system and receive, by the quantum system, a second quantum computation. Further, various embodiments determine a portion of the second quantum computation is substantially similar to a portion of the first quantum computation and use results of the first quantum computation as part of the second quantum computation.

20 Claims, 7 Drawing Sheets

UTILIZING CACHE IN A QUANTUM SYSTEM

BACKGROUND OF THE INVENTION

The present invention relates generally to a method, system, and computer program product for using quantum computing systems. More particularly, the present invention relates to a method, system, and computer program product for maximizing the utilization and efficiency of a quantum computing.

A quantum processing unit (QPU) is computational component of a quantum computer. It is where the qubits reside, and where algorithms are performed to achieve results. Like the central processing unit, or CPU, of a classical computer, a QPU requires supporting infrastructure to operate, such as control electronics, that enable single and double gate operations amongst the qubits which are needed for quantum computations. A quantum computer is a computer that exploits quantum mechanical phenomena to perform quantum computations. On small scales, physical matter exhibits properties of both particles and waves, and quantum computing leverages this behavior using specialized hardware.

The basic unit of information in quantum computing, the qubit (or "quantum bit"), serves the same function as the bit in classical computing. However, unlike a classical bit, which can be in one of two states (a binary), a qubit can exist in a superposition of its two "basis" states, which loosely means that it is in both states simultaneously. When measuring a qubit, the result is binary, but by performing multiple measurements (i.e., shots) of the algorithm a probabilistic output of the qubit can be achieved. If a quantum computer manipulates the qubit in a particular way, wave interference effects can amplify the desired measurement results. The design of quantum algorithms involves creating procedures that allow a quantum computer to perform calculations efficiently and quickly.

SUMMARY

Embodiments of the present invention disclose a computer-implemented method, a computer program product, and a system, the computer-implemented method comprising: performing a first quantum computation on a quantum processor of a quantum system; receiving, by the quantum system, a second quantum computation; determining a portion of the second quantum computation is substantially similar to a portion of the first quantum computation; and using results of the first quantum computation as part of the second quantum computation.

DETAILED DESCRIPTION

Figure 1:
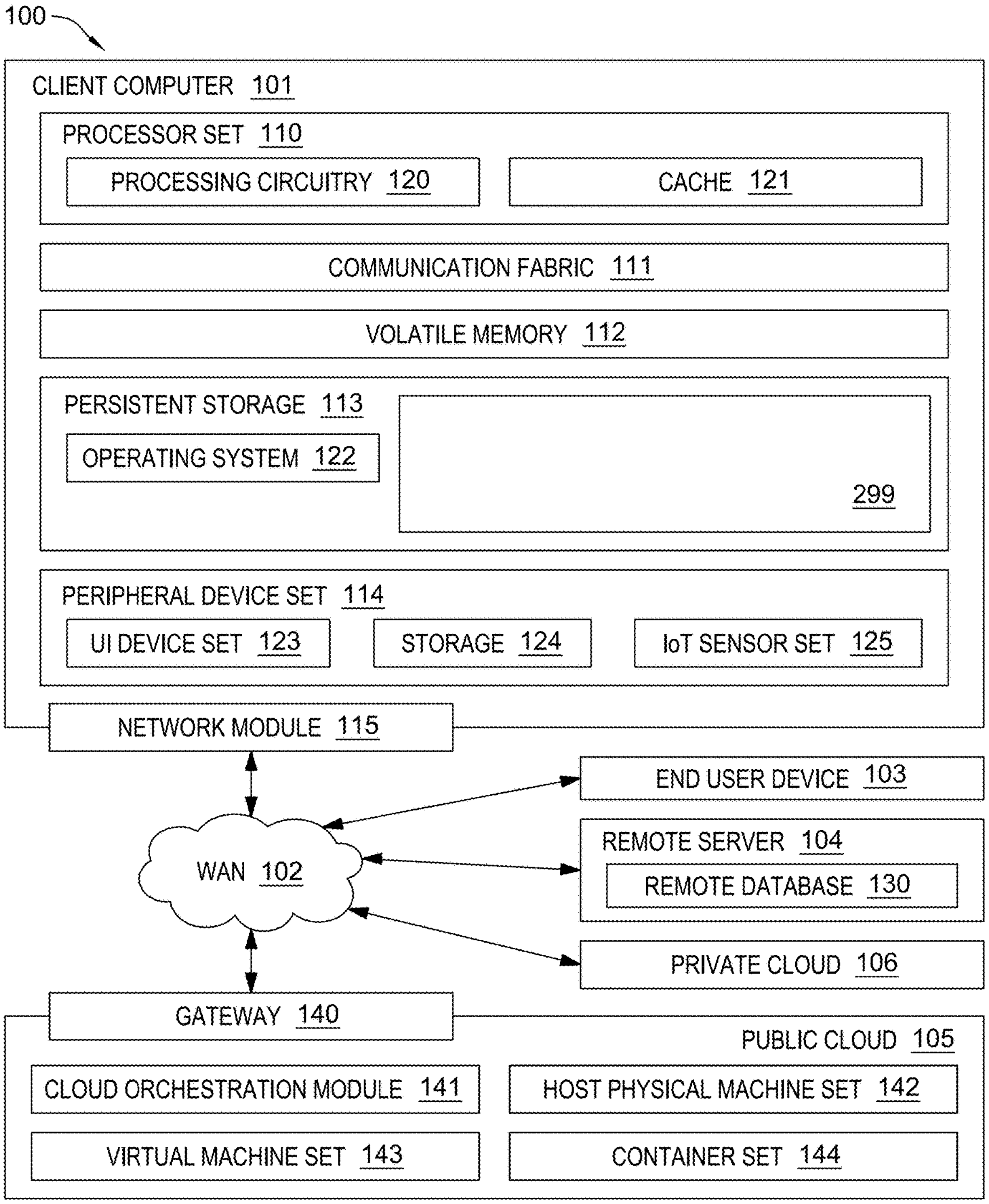
FIG. 1 is a functional block diagram illustrating a distributed data processing environment, executing a quantum job cache manager program, in accordance with an embodiment of the present invention.

Embodiments recognize that a plurality of quantum problems may be solved in a similar way (e.g., tutorials, receptive execution of experiments, or other problems known and understood in the art). Sessions provide a context for execution of jobs for a single user: minimizes queueing time while a session is (inter)active: in that time, subsequent jobs will be scheduled right away. Caching in sessions comprise but are not limited to transpilations and learnt Error Mitigation insights. Embodiments recognize that execution of jobs consume a predetermined amount of resources and that jobs are queued at the end of the queue resulting in longer execution wait times.

Embodiments improve the art and solve at least the issues above by caching job executions and combining caches on several layers which improves efficiency (e.g., reduces execution time and reduces the amount of resources required to execute a job). Embodiments improve the art and solve at least the issues above by performing a first quantum computation on a quantum processor of a quantum system, (ii) receiving, by the quantum system, a second quantum computation, (iii) determining a portion of the second quantum computation is substantially similar to a portion of the first quantum computation, and (iv) using results of the first quantum computation as part of the second quantum computation, wherein using results comprises sending results of the first quantum computation to a user sending the second quantum computation.

Embodiments increase device availability time without impacting results of service and increase throughput of jobs. Additionally, embodiments improve the art by reducing cost and queue time of quantum experiments. Embodiments reduce the cost and queue time of quantum experiments by facilitating the reduction in cost and queue time of users of tutorials who want to run on real hardware and reducing the cost and queue time for users of a working group (e.g., when these users follow the same algorithm and data)

Implementation of embodiments of the invention may take a variety of forms, and exemplary implementation details are discussed subsequently with reference to the Figures (i.e., FIG. 1-FIG. 5B).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as quantum job cache manager program (component) 299. In addition to component 299, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and component 299, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in component 299 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In various embodiments, component 299 utilizes cache jobs to execute a second job on a quantum computing system so that the same input will result in the same output. In various embodiments, responsive to a job submission or query within a job queue, component 299 receives input from a user that specify independent binary flags (e.g., "enable results to be used from cache data," or "enable the job to be cached to be utilized by others") which results in lower monetary costs and lower queue waiting time. In various embodiments, component 299 receives input from a user to disable the utilization of cached data and execute a true execution by utilizing fresh inputs and results. In various embodiments, a transpiler or compiler output can be cached (depending on how different calibration data is compared to when entries were cached). In various embodiments, component 299 combines cache from executed jobs on a quantum computing system on several layers (e.g., primitive input level, compilation result, experiment level).

In various embodiments component 299 caches and utilizes quantum computing results to reduce cost and efficiency (e.g., increase throughput of jobs in a queue) by (i) performing a first quantum computation on a quantum processor of a quantum system, (ii) receiving, by the quantum system, a second quantum computation, (iii) determining a portion of the second quantum computation is substantially similar to a portion of the first quantum computation, and (iv) using results of the first quantum computation as part of the second quantum computation, wherein using results comprises sending results of the first quantum computation to a user sending the second quantum computation.

In various embodiments, component 299 comprises and utilizes a rewarding scheme to increase cache utilization that incentivizes providing cache content. In various embodiments, different prices and/or percentages will be predetermined based on the quality of produced results for the executed job on the quantum computing system. In some embodiments, the predetermined different prices and/or percentages vary based on error mitigation.

In various embodiments, caching of the executed quantum job may occur on a plurality of levels. In various embodiments, component 299 comprises extensions to enhance job execution of a job (i.e., quantum computing calculation, measurement, and/or any unit of work known and understood in the art). In some embodiments, the extensions comprise of a tutorial mode in which some experiments are marked for free usage (out of the cache) and some experiments expand to "similar inputs" which are utilized for tutorials on how to execute a job with similar inputs. In various embodiments, component 299 caches results of a sampler and/or estimator which is utilized to generate tutorials that enable a secondary user to follow a primary user's work scenario and caches the image quantum computing called and/or generated from an application. In various embodiments, component 299 caches transpiled output (which has longer validity, its quality has a large impact in circuit quality and can be expensive to generate) and compiled output (which ages quickly but can be less expensive to generate).

Figure 2A:
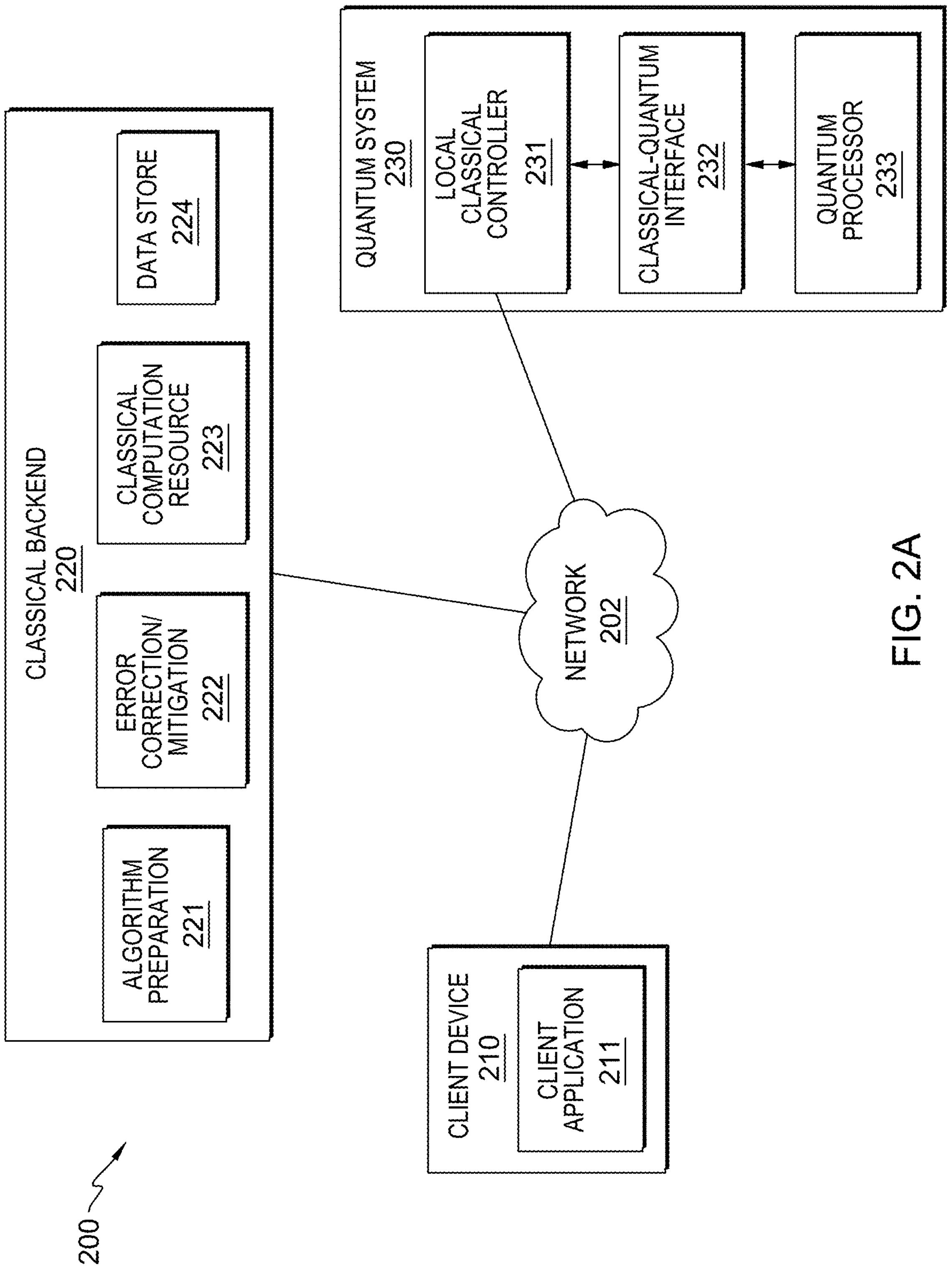
FIG. 2A is a functional block diagram illustrating a distributed data processing environment, executing the quantum job cache manager program, in accordance with an embodiment of the present invention.

FIG. 2A illustrates a block diagram of an example hybrid computing system 200 that can facilitate execution of a quantum algorithm. As shown, a client device 210 may interface with a classical backend 220 to enable computations with the aid of a quantum system 230.

Network 202 may be any combination of connections and protocols that will support communications between the client device 210, the classical backend 220, and the quantum system 230. In an example embodiment, network 202 may WAN 102.

Client device 210 may be an implementation of computer 101 or EUD 103, described in more detail with reference to FIG. 1, configured to operate in a hybrid computing system 200.

Client application 211 may include an application or program code that includes computations requiring a quantum algorithm or quantum operation. In an embodiment, client application 211 may include an object-oriented programming language, such as Python® ("Python" is a registered trademark of the Python Software Foundation), capable of using programming libraries or modules containing quantum computing commands or algorithms, such as QISKIT ("QISKIT" is a registered trademark of the International Business Machines Corporation). In another embodiment, client application 211 may include abstract machine instructions for performing a quantum circuit, such as OpenQASM. Additionally, user application may be any other high-level interface, such as a graphical user interface, having the underlying object oriented and/or machine level code as described above.

The classical backend 220 may be an implementation of computer 101, described in more detail with reference to FIG. 1, having program modules configured to operate in a hybrid computing system 200. Such program modules for classical backend 220 may include algorithm preparation 221, classical computation resource 223, and data store 224.

Algorithm preparation 221 may be a program or module capable of preparing algorithms contained in client application 211 for operation on quantum system 230. Algorithm preparation 221 may be instantiated as part of a larger algorithm, such as a function call of an API, or by parsing a hybrid classical-quantum computation into aspects for quantum and classical calculation. Algorithm preparation 221 may additionally compile or transpile quantum circuits that were contained in client application 211 into an assembly language code for use by the local classical controller 231 to enable the quantum processor 233 to perform the logical operations of the circuit on physical structures. During transpilation/compilation, an executable quantum circuit in the quantum assembly language may be created based on the calculations to be performed, the data to be analyzed, and the available quantum hardware. In one example embodiment, algorithm preparation 221 may select a quantum circuit from a library of circuits that have been designed for use in a particular problem. In another example embodiment, algorithm preparation 221 may receive a quantum circuit from the client application 211 and may perform transformations on the quantum circuit to make the circuit more efficient, or to fit the quantum circuit to available architecture of the quantum processor 233. Additionally, algorithm preparation 221 may prepare classical data from data store 224, or client application 211, as part of the assembly language code for implementing the quantum circuit by the local classical controller 231. Algorithm preparation 221 may additionally set the number of shots (i.e., one complete execution of a quantum circuit) for each circuit to achieve a robust result of the operation of the algorithm. Further, algorithm preparation 221 may update, or re-compile/re-transpile, the assembly language code based on parallel operations occurring in classical computing resource 223 or results received during execution of the quantum calculation on quantum system 230. Additionally, algorithm preparation 221 may determine the criterion for convergence of the quantum algorithm or hybrid algorithm.

Error Suppression/Mitigation 222 may be a program or module capable of performing error suppression or mitigation techniques for improving the reliability of results of quantum computations. Error suppression is the most basic level of error handling. Error suppression refers to techniques where knowledge about the undesirable effects of quantum hardware is used to introduce customization that can anticipate and avoid the potential impacts of those effects, such as modifying signals from Classical-quantum interface 232 based on the undesirable effects. Error mitigation uses the outputs of ensembles of circuits to reduce or eliminate the effect of noise in estimating expectation values. Error mitigation may include techniques such as Zero Noise Extrapolation (ZNE) and Probabilistic Error Cancellation (PEC).

Classical computing resource 223 may be a program or module capable of performing classical (e.g., binary, digital) calculations contained in client application 211. Classical calculations may include formal logical decisions, AI/ML algorithms, floating point operations, and/or simulation of Quantum operations.

Data store 224 may be a repository for data to be analyzed using a quantum computing algorithm, as well as the results of such analysis. Data store 224 may be an implementation of storage 124 and/or remote database 130, described in more detail with reference to FIG. 1, configured to operate in a hybrid computing system 200.

The quantum system 230 can be any suitable set of components capable of performing quantum operations on a physical system. In the example embodiment depicted in FIG. 2A, quantum system 230 includes a local classical controller 231, a classical-quantum interface 232, and quantum processor 233. In some embodiments, all or part of each of the local classical controller 231, a classical-quantum interface 232, and quantum processor 233 may be located in a cryogenic environment to aid in the performance of the quantum operations. In an embodiment, classical backend 220 and quantum system 230 may be co-located to reduce the communication latency between the devices.

Local classical controller 231 may be any combination of classical computing components capable of aiding a quantum computation, such as executing a one or more quantum operations to form a quantum circuit, by providing commands to a classical-quantum interface 232 as to the type and order of signals to provide to the quantum processor 233. Local classical controller 231 may additionally perform other low/no latency functions, such as error correction, to enable efficient quantum computations. Such digital computing devices may include processors and memory for storing and executing quantum commands using classical-quantum interface 232. Additionally, such digital computing devices may include devices having communication protocols for receiving such commands and sending results of the performed quantum computations to classical backend 220. Additionally, the digital computing devices may include communications interfaces with the classical-quantum interface 232. In an embodiment, local classical controller 231 may include all components of computer 101, or alternatively may be individual components configured for specific quantum computing functionality, such as processor set 110, communication fabric 111, volatile memory 112, persistent storage 113, and network module 115.

Classical-quantum interface 232 may be any combination of devices capable of receiving command signals from local classical controller 231 and converting those signals into a format for performing quantum operations on the quantum processor 233. Such signals may include electrical (e.g., RF, microwave, DC), optical signals, magnetic signals, or vibrational signals to perform one or more single qubit operations (e.g., Pauli gate, Hadamard gate, Phase gate, Identity gate), signals to preform multi-qubit operations (e.g., CNOT-gate, CZ-gate, SWAP gate, Toffoli gate), qubit state readout signals, and any other signals that might enable quantum calculations, quantum error correction, and initiate the readout of a state of a qubit. Additionally, classical-quantum interface 232 may be capable of converting signals received from the quantum processor 233 into digital signals capable of processing and transmitting by local classical controller 231 and classical backend 220. Such signals may include qubit state readouts. Devices included in classical-quantum interface 232 may include, but are not limited to, digital-to-analog converters, analog-to-digital converters, waveform generators, attenuators, amplifiers, filters, optical fibers, and lasers.

Quantum processor 233 may be any hardware capable of using quantum states to process information. Such hardware may include a collection of qubits, mechanisms to couple/entangle the qubits, and any required signal routings to communicate between qubits or with classical-quantum interface 232 in order to process information using the quantum states. Such qubits may include, but are not limited to, charge qubits, flux qubits, phase qubits, spin qubits, and trapped ion qubits, or any other suitable qubit structures. The architecture of quantum processor 233, such as the arrangement of data qubits, error correcting qubits, and the couplings amongst them, may be a consideration in performing a quantum circuit on quantum processor 233.

Figure 2B:
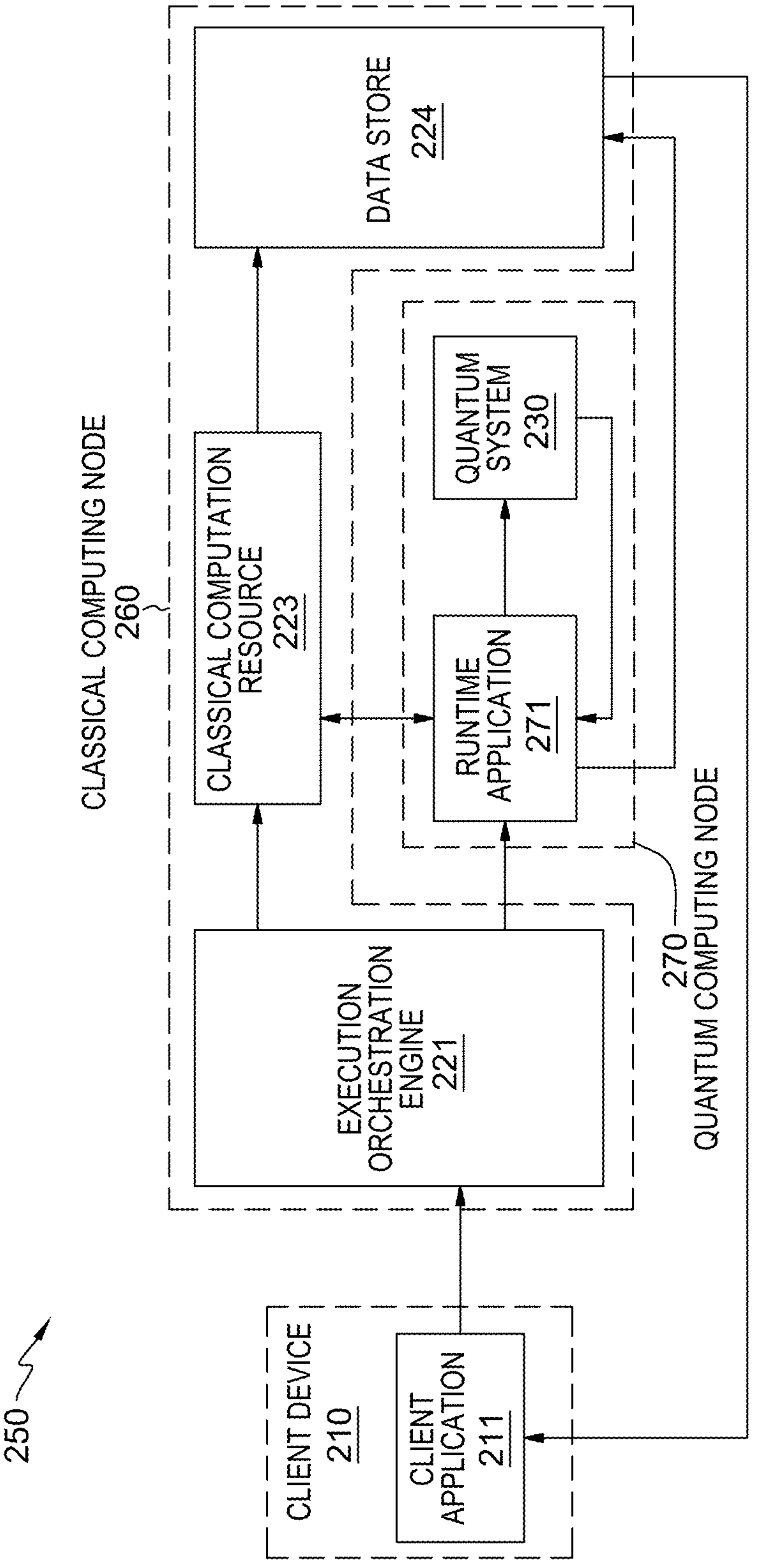
FIG. 2B is a functional block diagram illustrating a distributed data processing environment, executing the quantum job cache manager program, in accordance with an embodiment of the present invention.

Referring now to FIG. 2B, a block diagram is depicted showing an example architecture, and data transmission, of hybrid computation system 250 employed using a cloud architecture for classical backend 220. Hybrid computation system 250 receives an algorithm containing a computation from a client application 211 of client device 210. Upon receipt of the algorithm and request from client application 211, hybrid computation system 250 instantiates a classical computing node 260 and a quantum computing node 270 to manage the parallel computations. The classical computing node 260 may include one or more classical computers capable of working in tandem (e.g., utilizing the cloud computing environment described with reference to FIGS. 1 and 2A). For example, classical computing node 260 may include an execution orchestration engine 261, one or more classical computation resources 223, and a result data store 224. The backend quantum runtime system (e.g., network 202) may include a combination of classical and quantum computing components acting together to perform quantum calculations on quantum hardware including, for example, one or more quantum systems 230. The quantum computing node 270 may include a quantum runtime application 271 and one or more quantum systems 230.

The client application 211 may include programing instructions to perform quantum and classical calculations. In an embodiment, client application 211 may be in a general purpose computing language, such as an object oriented computing language (e.g., Python®), that may include classical and quantum functions and function calls. This may enable developers to operate in environments they are comfortable with, thereby enabling a lower barrier of adoption for quantum computation.

The execution orchestration engine 261, in using algorithm preparation 221, may parse the client application 211 into a quantum logic/operations portion for implementation on a quantum computing node 270, and a classical logic/operations portion for implementation on a classical node 260 using a classical computation resource 223. In an embodiment, parsing the client application 211 may include performing one or more data processing steps prior to operating the quantum logic using the processed data. In an embodiment, parsing the client application 211 may including segmenting a quantum circuit into portions that are capable of being processed by quantum computing node 270, in which the partial results of each of the segmented quantum circuits may be recombined as a result to the quantum circuit. Execution orchestration engine 261 may parse the hybrid algorithm such that a portion of the algorithm is performed using classical computation resources 223 and a session of quantum computing node 270 may open to perform a portion of the algorithm. Quantum runtime application 271 may communicate, directly or indirectly, with classical computation resources 223 by sending parameters/information between the session to perform parallel calculations and generate/update instructions of quantum assembly language to operate quantum system 230 and receiving parameters/information/results from the session on the quantum system 230. Following the parsing of the hybrid algorithm for calculation on quantum computing node 270 and classical computing node 260, the parallel nodes may iterate the session to convergence by passing the results of quantum circuits, or partial quantum circuits, performed on quantum system 230 to classical computing resource 223 for further calculations. Additionally, runtime application 271, using algorithm preparation 221, may re-parse aspects of the hybrid algorithm to improve convergence or accuracy of the result. Such operation results, and progress of convergence, may be sent back to client device 210 as the operations are being performed. By operating execution orchestration engine 261 in a cloud environment, the environment may scale (e.g., use additional computers to perform operations necessary) as required by the client application 211 without any input from the creators/implementors of client application 211. Additionally, execution orchestration engine 261, while parsing the client application 211 into classical and quantum operations, may generate parameters, function calls, or other mechanisms in which classical computation resource 223 and quantum computing node 270 may pass information (e.g., data, commands) between the components such that the performance of the computations enabled by client application 211 is efficient.

Classical computation resources 223 may perform classical computations (e.g., formal logical decisions, AI/ML algorithms, floating point operations, simulation of Quantum operations) that aid/enable/parallelize the computations instructed by client application 211. By utilizing classical computation resources 223 in an adaptively scalable environment, such as a cloud environment, the environment may scale (e.g., use additional computers to perform operations necessary including adding more classical computation resources 223, additional quantum systems 230, and/or additional resources of quantum systems 230 within a given quantum computing node 270) as required by the client application 211 without any input from the creators/implementors/developers of client application 211, and may appear seamless to any individual implementing client application 211 as there are no required programming instructions in client application 211 needed to adapt to the classical computation resources 223. Thus, for example, such scaling of quantum computing resources and classical computing resources may be provided as needed without user intervention. Scaling may reduce the idle time, and thus reduce capacity and management of computers in classical computing node 260.

Result data store 224 may store, and return to client device 210, states, configuration data, etc., as well as the results of the computations of the client application 211.

Implementation of the systems described herein may enable hybrid computing system 200, through the use of quantum system 230, to process information, or solve problems, in a manner not previously capable. The efficient parsing of the quantum or hybrid algorithm into classical and quantum segments for calculation may achieve efficient and accurate quantum calculations from the quantum system 230 for problems that are exponentially difficult to perform using classical backend 220. Additionally, the quantum assembly language created by classical backend 220 may enable quantum system 230 to use quantum states to perform calculations that are not classically efficient or accurate. Specifically, increasing the usage efficiency in the machines, which results in more efficiency (e.g., higher throughput) by leveraging workload splitting techniques to maximize the utilization of a quantum cloud platform, which enables an increase in computation while utilizing less energy. Such improvement may reduce the classical resources required to perform the calculation of the quantum or hybrid algorithm, by improving the capabilities of the quantum system 230.

Figure 3:
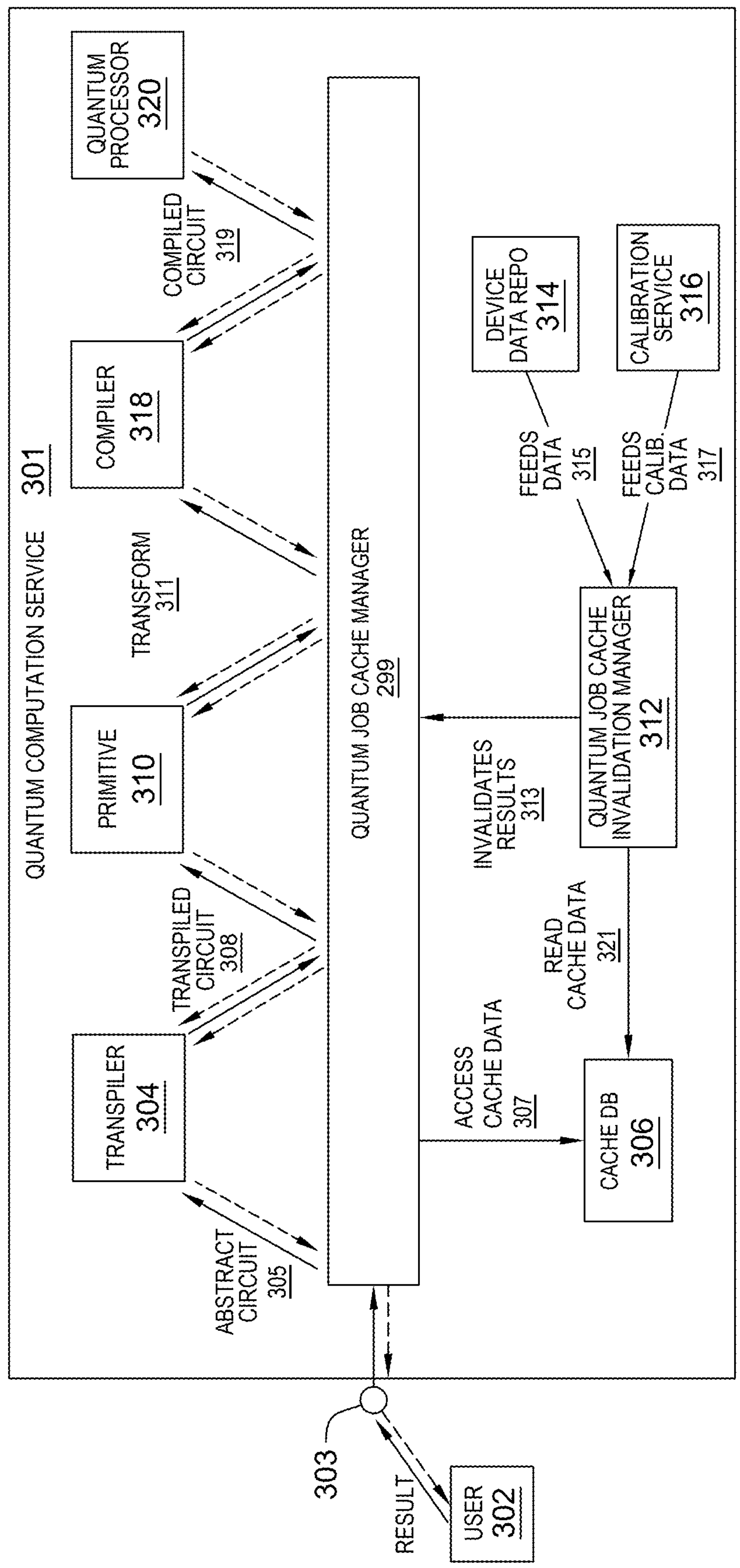
FIG. 3 illustrates a block diagram illustrating a distributed data process environment, executing the quantum job cache manager program, on a server computer within the distributed data processing environment of FIG. 1, in accordance with an embodiment of the present invention.

FIG. 3 illustrates block diagram of component 299, generally designated 300, in communication with client computer 101, remote server 104, private cloud 106, EUD 103, public cloud 105, quantum system 230, classical backend 220, and/or hybrid computation system 250, within distributed data processing environment 100, for optimizing the efficiency of job execution and QPU cloud utilization in a quantum system, in accordance with an embodiment of the present invention. FIG. 3 illustrates one example of a job request from a user through a quantum computing unit. FIG. 3 provides an illustration of one implementation and does not imply any limitations with regard to the environments in which different embodiments may be implemented. Many modifications to the depicted environment may be made by those skilled in the art without departing from the scope of the invention as recited by the claims.

In the depicted embodiment, quantum computation service 301 comprises transpiler 304, quantum job cache manager. A basic service request can be either a transpile request, or directly a call to a primitive (e.g., primitive 310) with a pre-transpiled circuit. In the depicted embodiment, user 302 submits a job request (e.g., an optimization problem) to interface 303 on a quantum computation service (e.g., Qiskit Runtime). In the depicted embodiment, quantum job cache manager (component) 299 receives the job request and identifies whether user 302 has elected to use cached results. In the depicted embodiment, responsive to determining that the user has elected to use cached results component 299 utilizes cache database 306 to determine whether there are cache results that fit within predetermined parameters of the job request. In the depicted embodiment, component 299 access cache data 307 from cache database 306. In various embodiments, responsive to identifying that there are cache results that fit within predetermined parameters of the job request, component 299 retrieves the cached results from cache database 306 to be utilized for the job request. In various embodiments, component 299 retrieves and utilizes result data at a plurality of levels. For example, the transpiler level, primitive level, and compiled circuit level.

In the depicted embodiment, transpiler 304 utilizes an abstract circuit 305 to receive the job request and execute, via quantum processor 320, the job request using the cached results. Transpiler 304 may optimize the abstract circuit 305 and map the optimize circuit on the topology of the actual quantum device (i.e., quantum computation service 301) to create transpiled circuit 308. In the depicted embodiment, component 299 receives the results of the executed job and outputs the results to user 302 via interface 303. In various embodiments, transpiler 304 retrieves and utilizes cache results from cache database 306 and outputs the results to user 302 via interface 303.

In the depicted embodiment, primitive 310 receives the cached results retrieved by component 299. In the depicted embodiment, primitive 310 utilizes the cached results to output results to component 299, wherein the results are output to interface 303 and/or stored on cache database 306. In the depicted embodiment, responsive to using received cached results, primitive 310 runs primitive functions. In various embodiments, based on the results, component 299 transforms 311 the transpiled circuit 308. For example, responsive to the result falling within a predetermined range, transforming the circuit to mitigate error and/or suppress the circuit.

In the depicted embodiment, compiler 318 receives the cached results component 299. In the depicted embodiment, compiler 318 utilizes the cached results to output results to component 200, wherein the results are output to interface 303 and/or stored on cache database 306. In the depicted embodiment, responsive to using received cached results, compiler 318 compiles the circuit 319 (e.g., compiles one or more transpiled circuit 308 and one or more transformed 311 circuit).

In the depicted embodiment, responsive to compiler 318 executing a compilation, quantum processor 320 executes the job request. In the depicted embodiment, quantum processor 320 outputs results to interface 303 via component 299, wherein the results are displayed to user 302. In various embodiments, component 299 stores the results on cache database 306.

In various embodiments, component 299 determines when cache entries (e.g., cached results) need to be invalidated. In the depicted embodiment, component 299 executes a data calibration on the cached results via device data repo 314 and calibration service 316, wherein device data repo 314 feeds device data 315 (e.g., configuration and state details) to quantum job cached invalidation manager 312 and calibration service 316 feeds calibration data 317 to quantum job cached invalidation manager 312. Quantum job cached invalidation manager 312 invalidates results 313 when the delta (e.g., the change/difference between old calibration data and new calibration data) reaches a predetermined value or degree of change and manages the scope of data to be invalidated. In the depicted embodiment, transpiler 304 utilizes an input that is output from quantum job cached invalidation manager 312, calibration service 316, and/or device data repo 314 (collectively referred to as "calibration components" hereinafter). Data calibration is utilized by component 299 to identify, on a device (e.g., quantum computing system), which signal to manipulate the qubits on the device. In various embodiments, an identified signal to manipulate qubits. In various embodiments, quantum job cache invalidation manager 312 reads cached data 321 from cache database 306.

In various embodiments, to address the drift and change in qubits in a quantum computing system, quantum job cache invalidation manager identifies when the delta between old calibration data and new calibration data reaches a predetermined value, wherein responsive to the delta between the old calibration data and the new calibration data reaches the predetermined value, transpiler 304 is triggered, wherein transpiler 304 favors a different qubit over the current qubit. The delta computation can use various approaches such as using the Euclidian distance of values, as well as weighted consideration that gives lower quality qubit a different weight in this computation as the impact of lower quality qubits can be larger, but these qubits are used less critically. In various embodiments, if the delta between old calibration data and new calibration data reaches a predetermined value then transpiler 304 identifies that a change is required. For example, there are two qubits identified as qubit 17 and qubit 18, wherein qubit 17 is of lower quality than qubit 18. In this example, if the calibration data changes so that the delta does not reach the predetermined value then there is no impact of the compiler 318 because the signals of the waveforms (i.e. the compiled circuit) do not need to be manipulated.

However, in a different example using the same qubits in the previous example, if the calibration data changes so that the delta reaches the predetermined value then the changes will have impact on the compiler because the signals of the waveforms will be identified as needing to manipulate one or more qubits so that the compiled output will be invalidated. In this example, the delta reaching a predetermined value effects insights because the delta indicates device drift, wherein responsive to qubit 17 being identified as lower quality than qubit 18 then transpiler 304 will favor and utilize qubit 18 until the quality of qubit 18 falls below qubit 17 then transpiler 304 will utilize qubit 17 or another available qubit. However, if the quality of qubit 17 remains lower than the quality of qubit 18, then the transpiler can retain its transpilation out, however, the drift might be significant enough to have the compiler 318 re-generate the compiled circuit. The invalidation of cache data is further detailed in FIG. 5A and FIG. 5B below.

Figure 4:
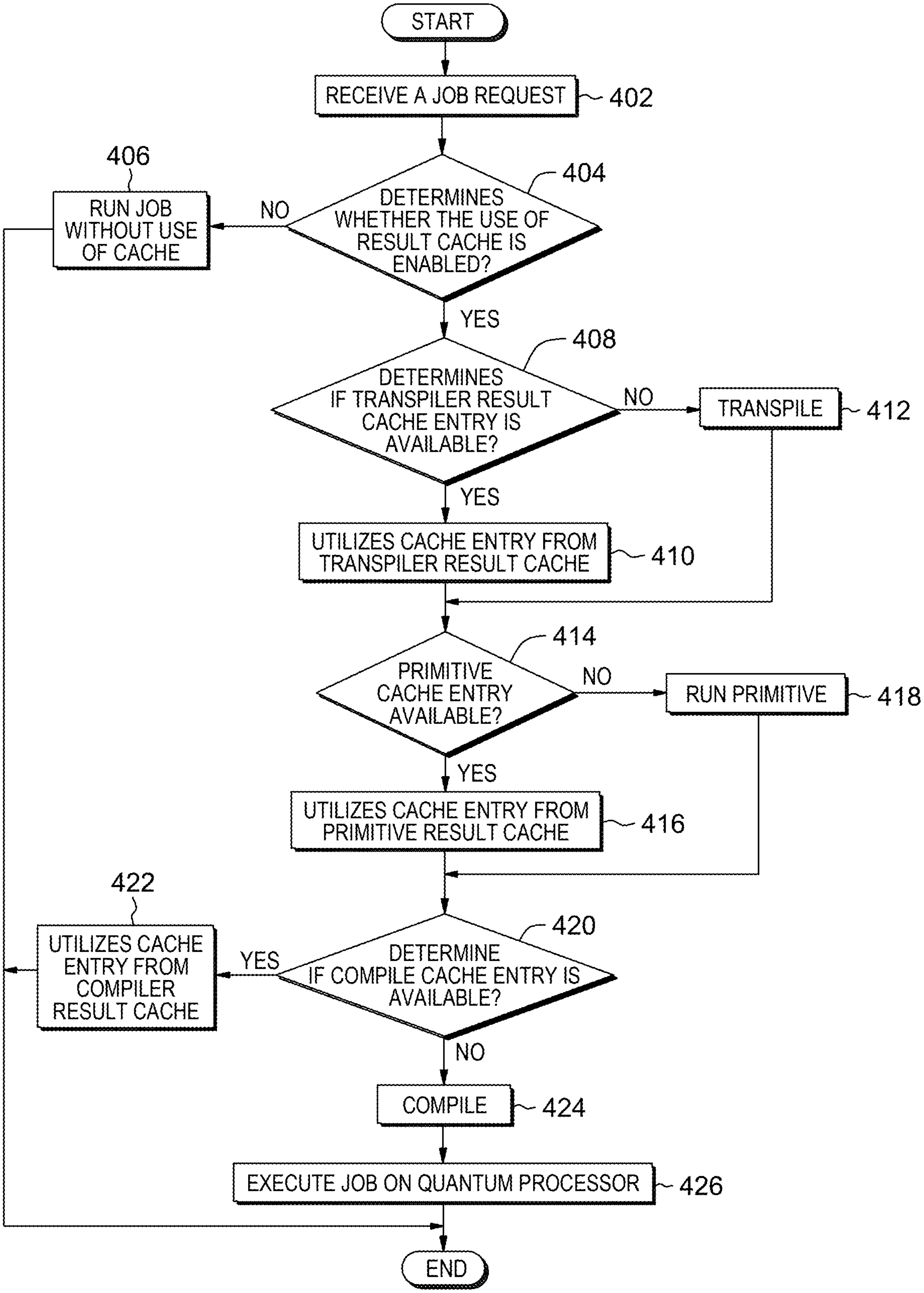
FIG. 4 illustrates operational steps of the quantum job cache manager program, on a server computer within the distributed data processing environment of FIG. 1, in accordance with an embodiment of the present invention.

FIG. 4 illustrates operational steps of component 299, generally designated 400, in communication with client computer 101, remote server 104, private cloud 106, EUD 103, public cloud 105, quantum system 230, classical backend 220, and/or hybrid computation system 250, within distributed data processing environment 100, for utilizing cache from a previously executed job in a quantum system, in accordance with an embodiment of the present invention. FIG. 4 provides an illustration of one implementation and does not imply any limitations with regard to the environments in which different embodiments may be implemented. Many modifications to the depicted environment may be made by those skilled in the art without departing from the scope of the invention as recited by the claims.

In block 402, component 299 receives a job request. In various embodiments, component 299 receives a job request to be executed on a quantum computing system from a user via a user interface.

In block 404, component 299 determines whether the use of result cache (i.e., cached results from previously executed jobs) is enabled. In various embodiments, component 299 determines whether the use of result cache is enabled for the received job request. In various embodiments, determining whether the use of result cache is enabled for the received job request comprises receiving instruction to use the result cache and permission to use the result cache, identifying matching factors and/or job request parameters, and/or identifying unique identifiers that indicate the result cache is enabled for use in a received job request. For example, responsive to a job submission or query within a job queue (i.e., job request), component 299 receives input from a user that specify independent binary flags (e.g., "enable results to be used from cache data," or "enable the job to be cached to be utilized by others") which results in lower monetary costs and lower queue waiting time.

In the depicted embodiment, if component 299 determines that the use of result cache is not enabled for the received job request (No block) then component 299 advances to block 406. However, in the depicted embodiment, if component 299 determines that the use of result cache is enabled for the received job request (Yes block) then component 299 advances to block 408.

In block 406, component 299 runs the job without the use of cached results. In various embodiments, responsive to determining that the use of result cache is not enabled, component 299 runs the received job without the result cache (e.g., transpile, primitive, compile, and execute) so that the data utilized during the run are new (i.e., fresh). In various embodiments, the transpile, primitive, compile and execute steps are similar to the ones used in the rest of the flow, i.e. are functionally equivalent to blocks 412, 418, 424 and 426. In various embodiments, depending on whether caching is allowed for this job, intermediate results of the job processing steps can be stored in the cache.

In block 408, component 299 determines if transpiler result cache entry is available. In various embodiments, component 299 determines if transpiler result cache entry is available in a cache database 306. In various embodiments, component 299 determines whether there are cache results associated with the transpiler that fit within predetermined parameters of the job request. Predetermined parameters of the job request may be any parameters associated with a platform and method to run the job that are known and understood in the art. For example, program identification (ID), inputs, outputs, runtime options, result decoder, unique identifier format, location, name of resource group, variables, attributes, and/or any other parameters associated with a job request known and understood in the art. In the depicted embodiment, if component 299 determines that transpiler result cache entry is available in a database (Yes block) then component 299 advances to block 410. However, in the depicted embodiment, if component 299 determines that transpiler result cache entry is not available in the database (No block) then component 299 advances to block 412.

In block 410, component 299 utilizes the cache entry from the transpiler result cache. In various embodiments, component 299 via the transpiler, utilize the available cache entry from the transpiler result cache to run the received job request. In various embodiments, component 299 receives results of the job run on the transpiler and outputs the results to the user via a user interface and/or stores the results to a database (e.g., cache database).

In block 412, component 299, via a transpiler, transpiles the job, optimizing the circuit instructions and layout for execution on noisy devices. In various embodiments, it uses the transpile function of Qiskit, to rewrite the input circuit of the job to match the topology of the targeted quantum device. These methods involve finding a good mapping of the circuit to the qubits of the physical device layout, routing to enable two-qubit gates between qubits not directly connected on the quantum device, translating to match the gate operations supported by the quantum device, optimizing the circuit to combine or eliminate gates, and improving scheduling of gate operations to get the best quality. In other embodiments, it can use AI-supported mechanisms to find good transpilation results. In various embodiments, depending on whether caching is allowed for this job, results of this step can be stored in the cache.

In block 414, component 299 determines if primitive cache entry is available. In various embodiments, component 299 determines if primitive cache entry is available in a cache database. In various embodiments, component 299 determines whether there are cache results associated with the primitive that fit within predetermined parameters of the job request. In the depicted embodiment, if component 299 determines that primitive cache entry is available in a database (Yes block) then component 299 advances to block 416. However, in the depicted embodiment, if component 299 determines that primitive cache entry is not available in the database (No block) then component 299 advances to block 418.

In block 416, component 299 utilizes cache entry from primitive result cache. In various embodiments, component 299 utilizes the cache entry from the primitive result cache. In various embodiments, component 299, utilizes the available cache entry from the primitive result cache to run the received job request. In various embodiments, component 299 receives results of the job run on the primitive and outputs the results to the user via a user interface and/or stores the results to a database (e.g., cache database).

In block 418, component 299 runs the primitive. In various embodiments, component 299 via the primitive, utilizes the available cache entry from the primitive result cache to run the received job request. Primitive execution involves the execution of the primitive functions, e.g. a Sampling or an Estimation function. Primitive functions are the base abstractions offered by the Qiskit Runtime programming interface to quantum computing. This interface takes care for the user of all lower level processing steps, including computation of expectation values and sampling of bitstrings based on input circuits, and how this execution is eventually performed on a quantum device. In various embodiments, depending on whether caching is allowed for this job, results of this block can be stored in the cache.

In block 420, component 299 determines if compiler cache entry is available. In various embodiments, component 299 determines if compiler cache entry is available in a cache database. In various embodiments, component 299 determines whether there are cache results associated with the compiler that fit within predetermined parameters of the job request. In the depicted embodiment, if component 299 determines that compiler cache entry is available in a database (Yes block) then component 299 advances to block 422. However, in the depicted embodiment, if component 299 determines that compiler cache entry is not available in the database (No block) then component 299 advances to block 424.

In block 422, component 299 utilizes cache entry from compiler result cache. In various embodiments, component 299 utilizes the cache entry from the compiler result cache. In various embodiments, component 299 via the compiler, utilizes the available cache entry from the compiler result cache to run the received job request. In various embodiments, component 299 receives results of the job run on the compiler and outputs the results to the user via a user interface and/or stores the results to a database (e.g., cache database).

In block 424, component 299 compiles the job. A compiler uses the transpiled circuit as input and generates instructions generating waveform signals as compiled output that can be used for execution. The generation of these waveform signal instructions is supported by calibration data of the system, to fine-tune the signals to implement gate operations as precisely as possible. In various embodiments, depending on whether caching is allowed for this job, results of the this step can be stored in the cache.

In block 426, component 299 executes job on quantum processor. Execution uses the waveform signal instructions provided by a compiler and runs these instructions on the control electronics. This control electronics will emit waveform signals to manipulate the qubits as defined by the input circuit. In various embodiments, component 299 executes the received job on the quantum processor or utilize the cached results from one or more of the previous steps to generate results (e.g., cache results from one or all of the layers discussed in the previous blocks). In other embodiments, results will have been returned by previous components, so that this component is only invoked when actual execution is needed by the logic of component 299.

Figure 5A:
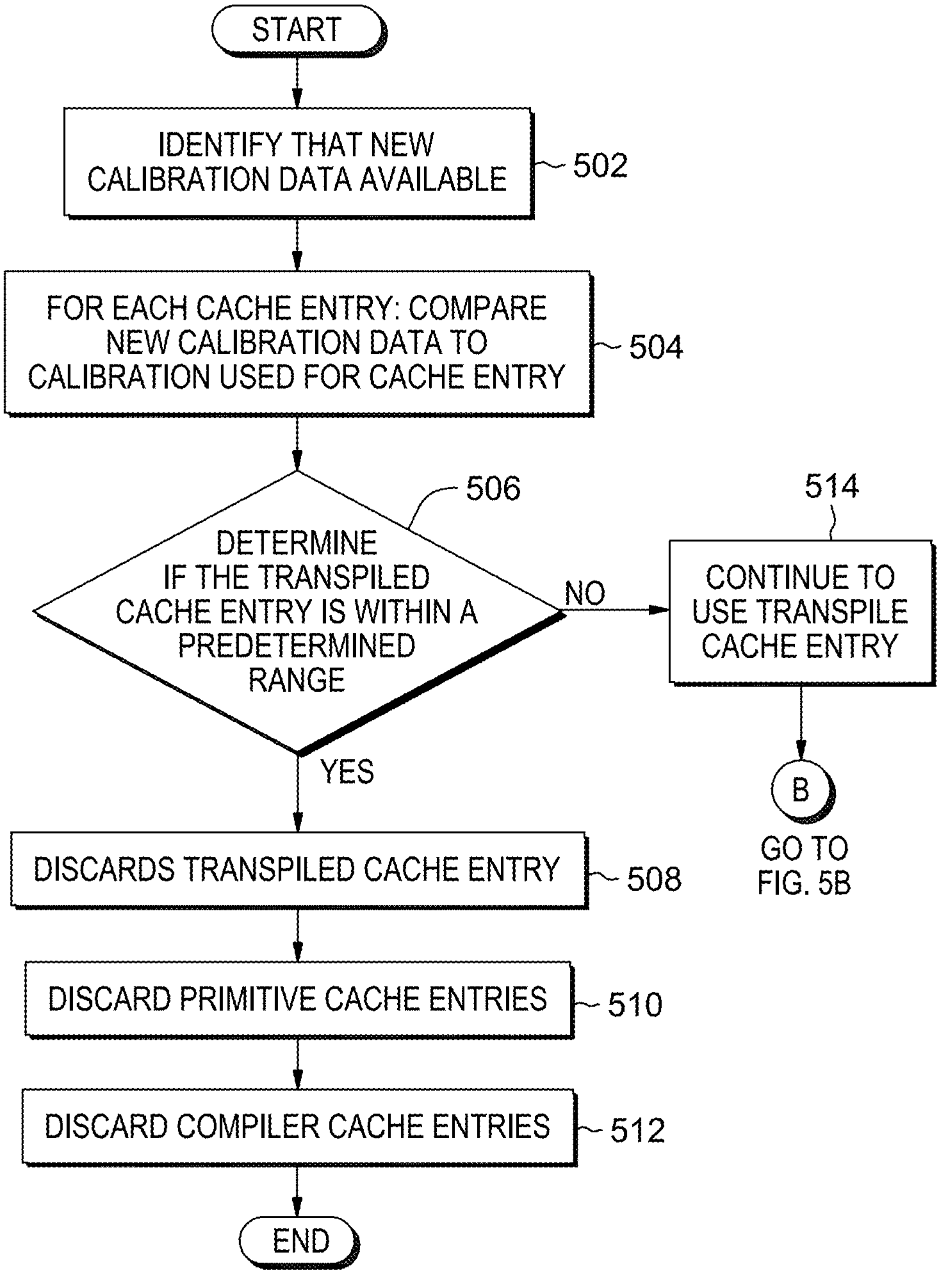
FIG. 5A illustrates operational steps of the quantum job cache manager program, on a server computer within the distributed data processing environment of FIG. 1, in accordance with an embodiment of the present invention.
Figure 5B:
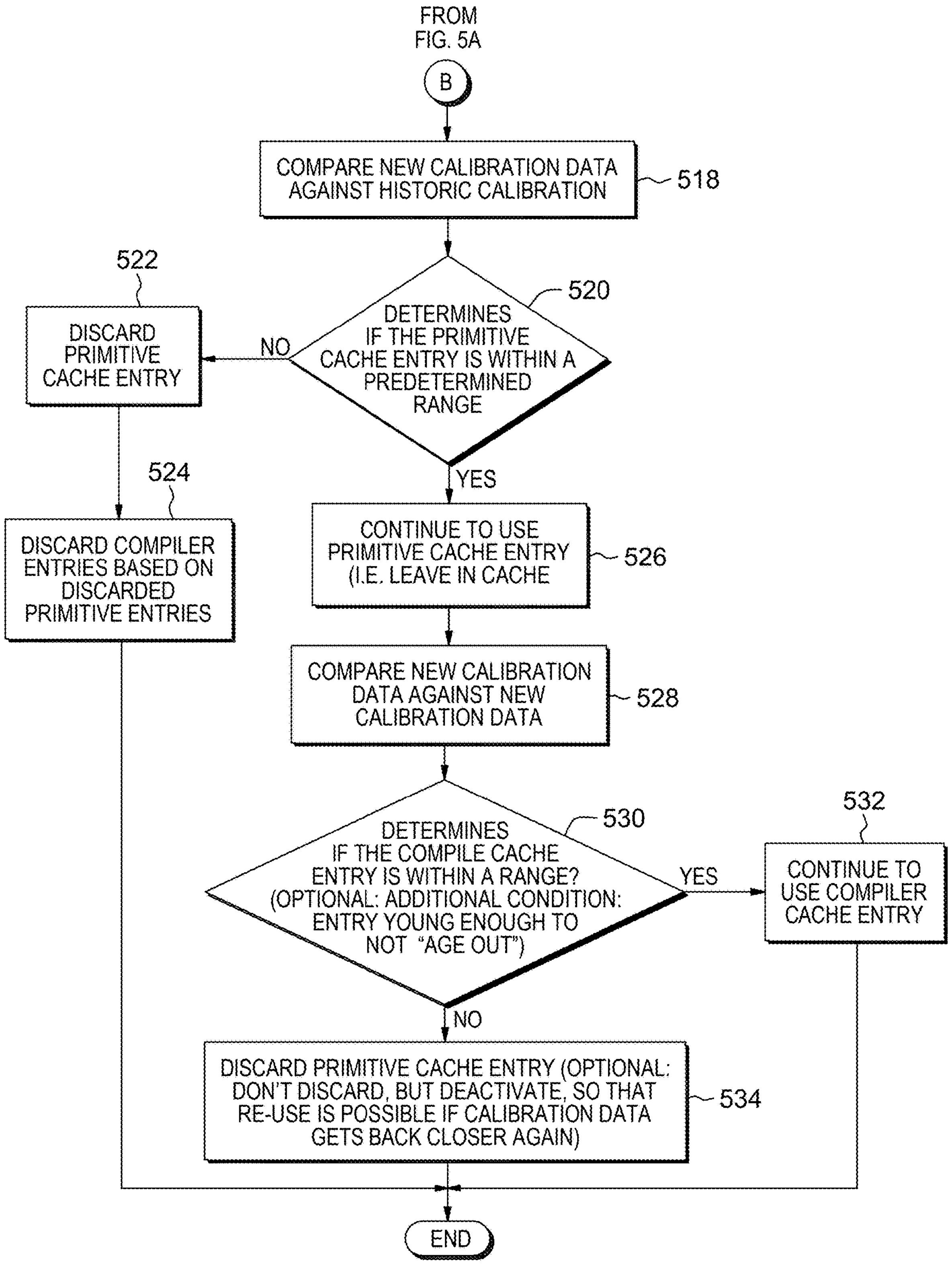
FIG. 5B illustrates operational steps of the quantum job cache manager program, on a server computer within the distributed data processing environment of FIG. 1, in accordance with an embodiment of the present invention.

FIG. 5A illustrates operational steps of component 299, through quantum job cache invalidation manager (invalidation manager) 312, generally designated 400, in communication with client computer 101, remote server 104, private cloud 106, EUD 103, public cloud 105, quantum system 230, classical backend 220, and/or hybrid computation system 250, within distributed data processing environment 100, for invalidating and disqualifying cache from a previously executed job in a quantum system, in accordance with an embodiment of the present invention. FIG. 5B provides an illustration of one implementation and does not imply any limitations with regard to the environments in which different embodiments may be implemented. Many modifications to the depicted environment may be made by those skilled in the art without departing from the scope of the invention as recited by the claims. In the depicted embodiment, component 299 facilitates these steps through quantum job cache invalidation manager (invalidation manager) 312.

In block 502, invalidation manager 312 identifies that new calibration data is available. In various embodiments, component identifies that new calibration data is available from a calibration service. In various embodiments, invalidation manager 312 continuously communicates and/or receives calibration data from a calibration service. In some embodiments, continuous communication may be a continuous stream of communication, a predetermined interval of communication, or an interconnect that is triggered when new data becomes available.

In block 504, invalidation manager 312 compares new calibration data to historic (previously stored and/or used) calibration data. In various embodiments, invalidation manager 312 compares the identified new calibration data against the calibration data used for all cached entries of user input of circuits. In various embodiments, for cached result entries, compiler result entries, invalidation manager 312 compares new calibration data against calibration data used for cached entries, wherein the delta between the identified new calibration data and the calibration data used for cached entry is utilized to determine the quality and order of qubits in the quantum system.

In block 506, invalidation manager 312 determines if the transpiler cache entry of the user input circuit (e.g., delta between new calibration data and historic calibration data) is within a predetermined range. In some embodiments, the entry may be the delta between the produced results utilizing the cached results from a previous execution based on the delta between the new calibration data and historic calibration data. In various embodiments, component determines if an entry is within a predetermined range by measuring and identifying the delta between the new calibration data and historic calibration data. For example, for cached transpiler result entries, the new calibration data is compared against the calibration data used for cached entry wherein if the delta associate with the qubits used by the cached entry are within the predetermined range, then the delta has not reached the predetermined range or threshold that indicates a degradation in quality of the utilized qubits or the accuracy between results. In another example, qubit 1 and qubit 2 gates are ordered by quality wherein qubit 1 is of higher quality of qubit 2. In this example, if the order is unchanged and mathematical ratio of error metrics between the qubits are unchanged then the qubits are within the predetermined range. In another example, if annotation of transpiled cache entry suggests that qubit 1 and qubit 2 gate has been utilized by a user then the qubits are within the predetermined range. The range applicability consideration can use various approaches such as using the Euclidian distance of values, as well as weighted consideration that gives lower quality qubit a different weight in this computation as the impact of lower quality qubits can be larger, but these qubits are used less critically. Also, if qualities of both qubits change but the ratio of qualities is close enough per said range applicability consideration, the cache entry would still be usable. In the depicted embodiment, if component 299 determines that the entry is not within a predetermined range (No block) then component 299 advances to block 508. However, in the depicted embodiment, if component 299 determines that the entry is within a predetermined range (Yes block) then component 299 advances to block 514. In some embodiments, a cache entry that is older than a certain age can optionally be considered invalid unconditionally.

In block 508, invalidation manager 312 discards transpiled cache entry. In the depicted embodiment, responsive to invalidation manager 312 determining that the entry is not within the predetermined range, invalidation manager 312 discards the transpiled cached entry from one or more databases. In various embodiments, responsive to component 299 determining that the entry is not within the predetermined range, component 299 deactivates the cache entry so that re-use is possible if the calibration data falls within the predetermined range. In some embodiments, instead of deletion, the cache entry can only be marked inactive to allow for future use (e.g. if device drive reverses and the calibration data approaches a historic state).

In block 510, invalidation manager 312 discards primitive cache entries. In various embodiments, responsive to invalidation manager 312 determining that the entry is not within the predetermined range, invalidation manager 312 discards primitive entries based on discarded transpiler entry. In various embodiments, responsive to invalidation manager 312 determining that the entry is not within the predetermined range, invalidation manager 312 deactivates the cache entry so that re-use is possible if the calibration data falls within the predetermined range. In some embodiments, instead of deletion, the cache entry can only be marked inactive to allow for future use (e.g. if device drive reverses and the calibration data approaches a historic state).

In block 512, invalidation manager 312 discards compiler cache entries. In various embodiments, responsive to invalidation manager 312 determining that the entry is not within the predetermined range, invalidation manager 312 discards compiler cache entries based on discarded primitive entries. In various embodiments, responsive to component 299 determining that the entry is not within the predetermined range, component 299 deactivates the cache entry so that re-use is possible if the calibration data falls within the predetermined range. In some embodiments, instead of deletion, the cache entry can only be marked inactive to allow for future use (e.g. if device drive reverses and the calibration data approaches a historic state).

In block 514, component 299 continues to utilize the transpiler cache entry as the cached data will remain usable in the cache for future quantum computing jobs. In the depicted embodiment, operations continue on FIG. 5B described below.

FIG. 5B illustrates operational steps of component 299, generally designated 400, in communication with client computer 101, remote server 104, private cloud 106, EUD 103, public cloud 105, quantum system 230, classical back-end 220, and/or hybrid computation system 250, within distributed data processing environment 100, for invalidating and disqualifying cache from a previously executed job in a quantum system, in accordance with an embodiment of the present invention. FIG. 5B provides an illustration of one implementation and does not imply any limitations with regard to the environments in which different embodiments may be implemented. Many modifications to the depicted environment may be made by those skilled in the art without departing from the scope of the invention as recited by the claims.

In block 518, invalidation manager 312 compares new calibration data against historic calibration data used for cached entry as relevant at the primitive level, such as influencing error mitigation or suppression techniques for a specific quantum device. In various embodiments, for cached primitive result entries (i.e., cached primitive results), invalidation manager 312 compares new calibration data against calibration data used for cached entry. In various embodiments, invalidation manager 312 identifies if the delta of the primitive output qubits utilized during compilation based on the cached entry data are within a predetermined range.

In block 520, invalidation manager 312 determines if the entry (e.g., delta between new calibration data and historic calibration data) is within a predetermined range. In various embodiments, component 299 identifies the age of the historic calibration data associated with the primitive and utilizes the age of the historic calibration data to determine the delta between the new calibration data and the historic calibration data (e.g., assists in identifying drift in the system and/or degradation of the qubits. In various embodiments, component utilizes error mitigation and error suppression metrics to identify whether the entry is within a predetermined range (e.g., readout matrix and/or any other error mitigation and error suppression metrics known and understood in the art), wherein if the measured and calculated error mitigation and error suppression metrics are mathematically within a predetermined value of the predetermined range then the entry is within the predetermined range. In some embodiments, the entry may be the delta between the produced results utilizing the cached results from a previous execution based on the delta between the new calibration data and historic calibration data. In various embodiments, component determines if an entry is within a predetermined range by measuring and identifying the delta between the new calibration data and historic calibration data. For example, the range applicability consideration for primitive cache entries can include the output of error mitigation or suppression functions. In the depicted embodiment, if invalidation manager 312 determines that the entry is not within a predetermined range (No block) then invalidation manager 312 advances to block 522. However, in the depicted embodiment, if invalidation manager 312 determines that the entry is within a predetermined range (Yes block) then invalidation manager 312 advances to block 526. In some embodiments, a cache entry that is older than a certain age can optionally be considered invalid unconditionally.

In block 522, invalidation manager 312 discards primitive cache entry. In the depicted embodiment, responsive to component 299 determining that the entry is not within the predetermined range, component 299 discards the primitive cached entry from one or more databases. In various embodiments, responsive to component 299 determining that the entry is not within the predetermined range, component 299 deactivates the cache entry so that re-use is possible if the calibration data falls within the predetermined range. In some embodiments, instead of deletion, the cache entry can only be marked inactive to allow for future use (e.g. if device drive reverses and the calibration data approaches a historic state).

In block 524, invalidation manager 312 discards compiler cache entries based on discarded primitive entries. After discarding, cached data cannot be used in future requests for quantum computing executions anymore, but execution will have to run the primitive in any case. In some embodiments, instead of deletion, the cache entry can only be marked inactive to allow for future use (e.g. if device drive reverses and the calibration data approaches a historic state).

In block 526, component 299 continues to utilize primitive cache entry, as the cached data will remain usable in the cache for future quantum computing jobs.

In block 528, invalidation manager 312 compares new calibration data to historic calibration data. In various embodiments, for cached compiler result entries (i.e., cached compiler results), component 299 compares new calibration data against calibration data used for cached entry. In various embodiments, component 299 identifies if the delta of the qubits utilized during compilation based on the cached entry data are within a predetermined range.

In block 530, invalidation manager 312 determines if the entry (e.g., delta between new calibration data and historic calibration data) is within a predetermined range. In various embodiments, invalidation manager 312 identifies the age of the historic calibration data associated with the compiler and utilizes the age of the historic calibration data to determine the delta between the new calibration data and the historic calibration data (e.g., assists in identifying drift in the system and/or degradation of the qubits. In various embodiments, component compares waveform similarity of gate operations used by the cache entry, wherein if the comparison between waveforms by subtracting waveform signals is mathematically within a predetermined value, then the entry is within the predetermined range. For example, for caching compilation results, the shape of the ideal waveform signals to execute gate operations is considered. If that waveform signal does not require significant changes due to the updated calibration data, the entry can be continued to use. This consideration can be made for every type of gate on every qubit individually, which can even result in partial usability of cached entries. In the depicted embodiment, if invalidation manager 312 determines that the entry is not within a predetermined range (No block) then invalidation manager 312 advances to block 534. However, in the depicted embodiment, if invalidation manager 312 determines that the entry is within a predetermined range (Yes block) then invalidation manager 312 advances to block 532.

In block 532, invalidation manager 312 continue to use compiler cache entry, as the cached data will remain usable in the cache for future quantum computing jobs. In various embodiments, responsive to invalidation manager 312 determining that the entry is within a predetermined range, invalidation manager 312, via a compiler, continues to run the job utilizing the compiler cache data.

In block 534, component 299 discards compiler cache entry. In various embodiments, component 299 discards primitive and/or compiler cached entries. After discarding, cached data cannot be used in future requests for quantum computing executions anymore, but execution will have to run the compilation step in any case. In some embodiments, instead of deletion, the cache entry can only be marked inactive to allow for future use (e.g. if device drive reverses and the calibration data approaches a historic state). In some embodiments, instead of deletion, the cache entry can only be marked inactive to allow for future use (e.g. if device drive reverses and the calibration data approaches a historic state).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
performing a first quantum computation on a quantum processor of a quantum computing system;
caching results from the first quantum computation at a plurality of levels of the quantum computing system, wherein the plurality of levels comprise a transpiler level, a primitive level, and a compiled circuit level;
receiving, by the quantum computing system, a second quantum computation;
determining a portion of the second quantum computation is substantially equivalent to a portion of the first quantum computation;
combining the cached results at the plurality of levels; and
using the combined cache results from the first quantum computation as part of the second quantum computation.

2. The method of claim 1, wherein using results comprises sending results of the first quantum computation to a user sending the second quantum computation.

3. The method of claim 1, further comprising:
determining that a cache entry is invalid, wherein determining that the cache entry is invalid comprises:
executing a data calibration on the cached results, wherein a delta between a current entry or result and a historic entry or result is measured.

4. The method of claim 3, further comprising:
responsive to the delta reaching a predetermined range, optimizing, through transpilation, a circuit for a specific back-end topology.

5. The method of claim 1, further comprising:
utilizing a rewarding scheme to increase cache utilization that incentivizes providing cache content.

6. The method of claim 1, further comprising:
utilizing and measuring a delta between a current entry and a historic entry at a plurality of levels of a quantum computing system processing.

7. The method of claim 6, further comprising:
responsive to the delta reaching a predetermined value or degree of change, invalidating the results; and
managing the results and cached to be invalidated.

8. A computer system comprising:
one or more computer processors;
one or more computer readable storage devices;
program instructions stored on the one or more computer readable storage devices for execution by at least one of the one or more computer processors, the stored program instructions comprising:
program instructions to perform a first quantum computation on a quantum processor of a quantum computing system;
program instructions to cache results from the first quantum computation at a plurality of levels of the quantum computing system, wherein the plurality of levels comprise a transpiler level, a primitive level, and a compiled circuit level;
program instructions to receive, by the quantum computing system, a second quantum computation;
program instructions to determine a portion of the second quantum computation is substantially equivalent to a portion of the first quantum computation;
program instructions to combine the cached results at the plurality of levels; and
program instructions to use results of the combined cache results from the first quantum computation as part of the second quantum computation.

9. The computer system of claim 8, wherein using results comprises sending results of the first quantum computation to a user sending the second quantum computation.

10. The computer system of claim 8, further comprising:
program instructions to determine that a cache entry is invalid, wherein determining that the cache entry is invalid comprises:
program instructions to execute a data calibration on the cached results, wherein a delta between a current entry or result and a historic entry or result is measured.

11. The computer system of claim 10, further comprising:
responsive to the delta reaching a predetermined range, program instructions to optimize, through transpilation, a circuit for a specific back-end topology.

12. The computer system of claim 8, further comprising:
program instructions to utilize a rewarding scheme to increase cache utilization that incentivizes providing cache content.

13. The computer system of claim 8, further comprising:
program instructions to utilize and measure a delta between a current entry and a historic entry at a plurality of levels of a quantum computing system processing.

14. The computer system of claim 13, further comprising:
responsive to the delta reaching a predetermined value or degree of change, program instructions to invalidate the results; and
program instructions to managing the results and cached data to be invalidated.

15. A computer program product comprising:
one or more computer readable storage devices and program instructions stored on the one or more computer readable storage devices, the stored program instructions comprising:
program instructions to perform a first quantum computation on a quantum processor of a quantum computing system;
program instructions to cache results from the first quantum computation at a plurality of levels of the quantum computing system, wherein the plurality of levels comprise a transpiler level, a primitive level, and a compiled circuit level;
program instructions to receive, by the quantum computing system, a second quantum computation;

program instructions to determine a portion of the second quantum computation is substantially equivalent to a portion of the first quantum computation;

program instructions to combine the cached results at the plurality of levels; and program instructions to use the combined cache results from the first quantum computation as part of the second quantum computation.

16. The computer program product of claim 15, wherein using results comprises sending results of the first quantum computation to a user sending the second quantum computation.

17. The computer program product of claim 15, further comprising:

program instructions to determine that a cache entry is invalid, wherein determining that the cache entry is invalid comprises:

program instructions to execute a data calibration on the cached results, wherein a delta between a current entry or result and a historic entry or result is measured.

18. The computer program product of claim 17, further comprising:

responsive to the delta reaching a predetermined range, program instructions to optimize, through transpilation, a circuit for a specific back-end topology.

19. The computer program product of claim 15, further comprising:

program instructions to utilize a rewarding scheme to increase cache utilization that incentivizes providing cache content.

20. The computer program product of claim 15, further comprising:

program instructions to utilize and measure a delta between a current entry and a historic entry at a plurality of levels of a quantum computing system processing;

responsive to the delta reaching a predetermined value or degree of change, program instructions to invalidate the results; and program instructions to managing the results and cached data to be invalidated.

* * * * *